United States Patent [19]

Palmer

[11] 3,878,105

[45] Apr. 15, 1975

[54] OPTICAL RADIATION TRANSMISSION AND DETECTION DEVICE

[75] Inventor: John P. Palmer, Pomona, Calif.

[73] Assignee: General Dynamics Corporation, Pomona, Calif.

[22] Filed: May 28, 1974

[21] Appl. No.: 473,856

[52] U.S. Cl. .................. 250/211 R; 357/30

[51] Int. Cl. .................. H01j 39/12

[58] Field of Search .................. 250/211 R, 211 J, 203; 357/29, 30

[56] References Cited

UNITED STATES PATENTS

| | | | |
|---|---|---|---|
| 3,622,844 | 11/1971 | Barelli et al. | 357/30 |
| 3,693,016 | 9/1972 | Weber | 250/211 J |
| 3,742,223 | 6/1973 | Carr et al | 250/203 |

*Primary Examiner*—James W. Lawrence
*Assistant Examiner*—D. C. Nelms
*Attorney, Agent, or Firm*—Neil F. Martin; Edward B. Johnson

[57] ABSTRACT

The device incorporates an outer and base electrode sandwiching a photosensitive layer. The outer electrode layer is opaque and overlies substantially the entire photosensitive layer with the exception of an optical radiation transmission opening. The photosensitive layer is transparent to at least a portion of the optical radiation incident on the device. The optical radiation passed by the photosensitive layer is also transmitted through a transparent base electrode layer so that the device may be utilized in a stacked, multi-sensor configuration. The photosensitive layer changes in effective electrical properties over an optically controlled region which extends under the opaque layer beyond the region of directly incident optical radiation.

5 Claims, 3 Drawing Figures

OPTICAL RADIATION TRANSMISSION AND DETECTION DEVICE

BACKGROUND OF THE INVENTION

In many applications it is desirable to have a photodetector that is sensitive to light in one spectral region, but which passes light in another spectral region. Various prior art devices have been devised to accomplish this desired result. In some such prior art systems the basic detectors utilized in association with a plurality of filters which remove successive portions of the light spectrum so that by combining the signals from that plurality of detectors it is possible to determine the relative magnitude of the various light spectra. In other devices, various photosensitive elements are stacked one on the other, and ohmic contacts made along the stepped edges of the plural layers. The layers are arranged so that each successive layer has a band gap energy greater than the preceeding layer. However, these devices require substantially the entire layer of photosensitive material to be directly illuminated by the incident light, and are therefore not susceptible to use where masking of the exterior photosensitive layer is desirable, such as for high resolution optics. Further, the signals produced by the various layers effect the signal from the adjacent layers and result in the requirement for elaborate readout interpretation.

In another type of prior art device a transparent outer electrode overlies the photosensitive layer; and these devices require extremely close manufacturing tolerances in that outer electrode thickness must be precisely controlled to transmit a satisfactory quantity of light while maintaining good electrical properties.

Therefore, it is desirable to have an optical radiation transmission and detection device that incorporates a photosensitive layer masked by an outer electrode layer and which passes the radiation of a substantial portion of the optical radiation spectrum through the base electrode for detection by a non-interrelated secondary detector.

SUMMARY OF THE INVENTION

An exemplary embodiment of the invention is described in association with a photoconductive device. However, the device is also applicable to photovoltaic and other detectors wherein incident optical radiation alters the electrical properties of a photosensitive layer.

In the exemplary embodiment a thin film photoconductive layer of cadmium sulfide doped with copper is sandwiched between an outer layer of aluminum and a base layer of transparent tin oxide.

The outer aluminium layer forms a first electrode for contact with the photoconductive layer and incorporates a round light transmission window. Thus, the outer layer, in part, forms an annulus around the light transmission window. Light incident on the cadmium sulfide layer lowers the effective electrical resistance of the photoconductive layer over an optically controlled region. According to prior art theories related to optical detector design it has been assumed, and detectors had been designed in accordance with the assumption, that the optically controlled region was limited to that directly illuminated by the incident optical radiation. The application of this assumption to a device configured according to the instant invention results in the conclusion that only the circular section of the photoconductive layer corresponding to the projection of the circular opening will have altered electrical properties, that is, reduced resistance. Further, that since the outer electrode does not contact this area that there will be little or no change in the electrical resistance between electrodes. However, contrary to the expectations according to prevailing theories, applicant has discovered that edge effects, possibly aided by scattering and dispersion, produce a sufficient expansion of the transmitted optical radiation under the edge of the outer electrode to produce an optically controlled region between the electrodes. The effective electrical resistance through this region is substantially lowered and the lowered resistance appears in parallel with the relatively higher resistance of the remaining portion of the photoconductive layer under the outer electrode. In accordance with conventional electrical theory this parallel combination results in a substantial net reduction in resistance between electrodes.

Thus, a sensitive detector is produced in a configuration that permits stacking for multidetector applications. The light energy not absorbed by the photoconductive layer is transmitted through the second or base electrode and passes through a transparent substrate to one or more additional detectors. The adjacent detector may be a device comparable to the first device. Where comparable devices are incorporated, the device lends itself to stacking of multiple detectors. In the second and additional detectors photosensitive layers incorporating different materials are utilized, each layer being sensitive to a different spectral range of the incident optical radiation. In such an installation, each of the subsequent devices is wholly electrically independent of the others.

It is therefore an object of the invention to provide a new and improved optical radiation transmission and detection device.

It is another object of the invention to provide a new and improved optical radiation transmission and detection device with improved sensitivity.

It is another object of the invention to provide a new and improved optical radiation transmission and detection device that is electrically independent of adjacent stacked detectors.

It is another object of the invention to provide a new and improved optical radiation transmission and detection device with a simple mask overlying the photosensitive layer.

Other objects and many attendant advantages of the invention will become more apparent upon a reading of the following detailed description together with the drawings in which like reference numerals refer to like parts throughout and in which.

Figure 1:
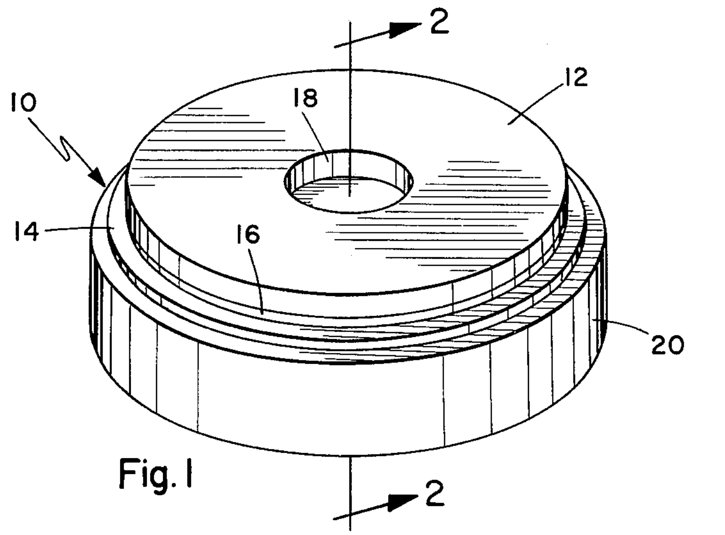
FIG. 1 is a perspective view of a typical photodetector.

Referring now to the drawings there is illustrated a detection and transmission device 10 according to the invention. In the exemplary embodiment of the device 10 the upper electrode comprises an outer electrode layer 12. The opposing electrode comprises a base electrode layer 14. The two electrode layers 12 and 14 sandwich the photoconductive layer 16. In the practice of the invention for the transmission of light frequencies other than in the ultra-violet spectrum the use of a photoconductor of cadmium sulfide doped with copper has been found to be particularly effective. The base electrode layer may advantageously be tin oxide. A thin layer of tin oxide provides good electrical contact to the photoconductor while transmitting substantially all of the light energy passed through the photoconductive layer 16. The outer electrode layer 12 is comprised of a layer of aluminium with a circular optical radiation transmission opening 18. The thickness of the aluminium electrode is not critical since the layer does not have to transmit optical radiation. The transducer is in a generally cylindrical configuration and therefore the aluminium electrode 12 comprises an annulus surrounding the optical radiation transmission opening 18. The entire assembly may be received on a transparent glass substrate 20 which provides support, rigidity, and protects the delicate layers comprising the device. Electrical connections 22 and 24 deliver voltage from a source of electrical potential such as battery 26 to the electrodes 12 and 14. Current flow is monitored on meter 28.

Figure 2:
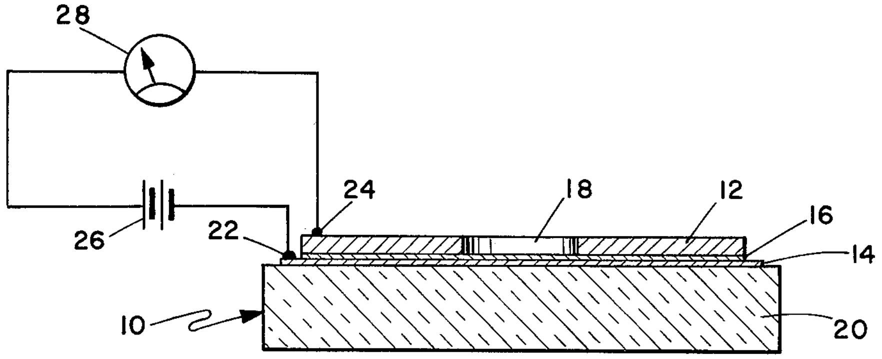
FIG. 2 is a sectional view taken on line 2—2 of FIG. 1.
Figure 3:
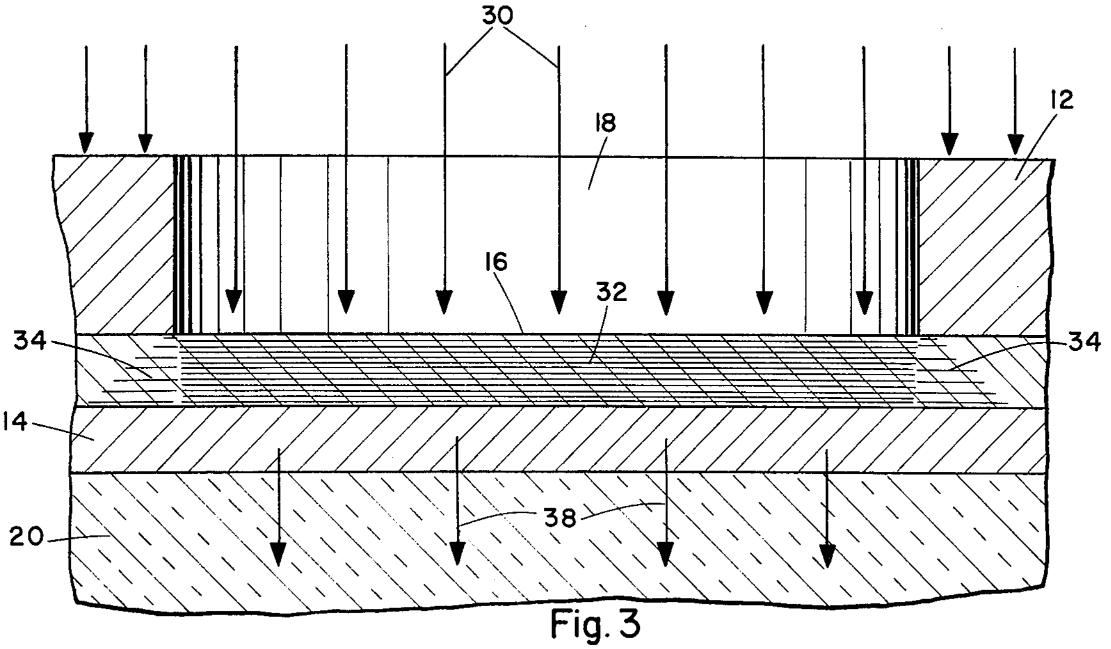
FIG. 3 is an enlarged view of a portion of FIG. 2.

Referring now to FIG. 2, the device 10 is shown in cross-section with incident optical radiation indicated diagrammatically. All of the incident optical radiation 30 is blocked by the opaque aluminium outer electrode layer 12 excepting that incident upon the light transmission window 18. This light is transmitted to become incident upon the photoconductive layer 16. The heavily shaded area 32 is illustrative of that area assumed by prior art devices to be effective in the optically controlled area. However, it has been discovered that an additional area, as is represented by the shaded area 34 is optically controlled. The area 34 underlies the edge of the outer electrode 12 and thus provides a path of reduced resistance through the optically controlled area 34 to the base electrode 14. The resistance in the optically controlled area will be reduced from a maximum on the order of $10^{11}$ohms resistivity to a minimum on the order of $10^{4}$ohms. The decreased resistance between the electrodes results in an increased current flow and is detected on meter 28.

The mechanism by which this increased effective area is obtained is not fully understood by applicant, however it is believed that edge effects and possibly scattering and diffraction of the incident light take place in the photoconductor immediately adjacent the light transmission window 18.

The remaining light energy which has not been absorbed by the photoconductive layer is passed through the base electrode layer 14 as is illustrated at 38. The light energy also passes through the substrate 20 and then may be made to be incident upon adjacent detectors in a stacked array.

Having described my invention, I now claim:

1. An optical detector for producing a change interelectrode electrical characteristics in response to incident optical radiation, and for transmitting a portion of said radiation, wherein the improvement comprises:

a base electrode layer, a photosensitive layer, an outer electrode layer having an optical radiation transmission opening therethrough, said outer electrode layer comprising electrically conductive and optically opaque material substantially completely overlying said photosensitive layer excepting said opening and comprising an annulus around said opening, said base electrode layer substantially completely underlying said photosensitive layer an in electrical contact therewith and being open to the surrounding environment through said opening, said photosensitive layer changes in effective electrical properties in an optically controlled region extending between said electrodes when exposed to optical radiation, a portion of said optically controlled region underlies said opaque electrode layer, said photosensitive layer passing at least a portion of said incident optical radiation, said base electrode layer being transparent to at least a portion of said incident optical radiation passed by said photoconductive layer.

2. The optical detector according to claim 1, wherein:

said photosensitive layer comprises a thin film of photoconductive material.

3. The optical detector according to claim 2, wherein:

said thin film photoconductive material comprises cadmium sulfide doped with copper.

4. The optical detector according to claim 1, wherein:

said base electrode layer comprises tin oxide.

5. The optical detector according to claim 1, wherein:

each of said layers is substantially planar, said opening is substantially circular.

* * * * *